UNITED STATES PATENT OFFICE.

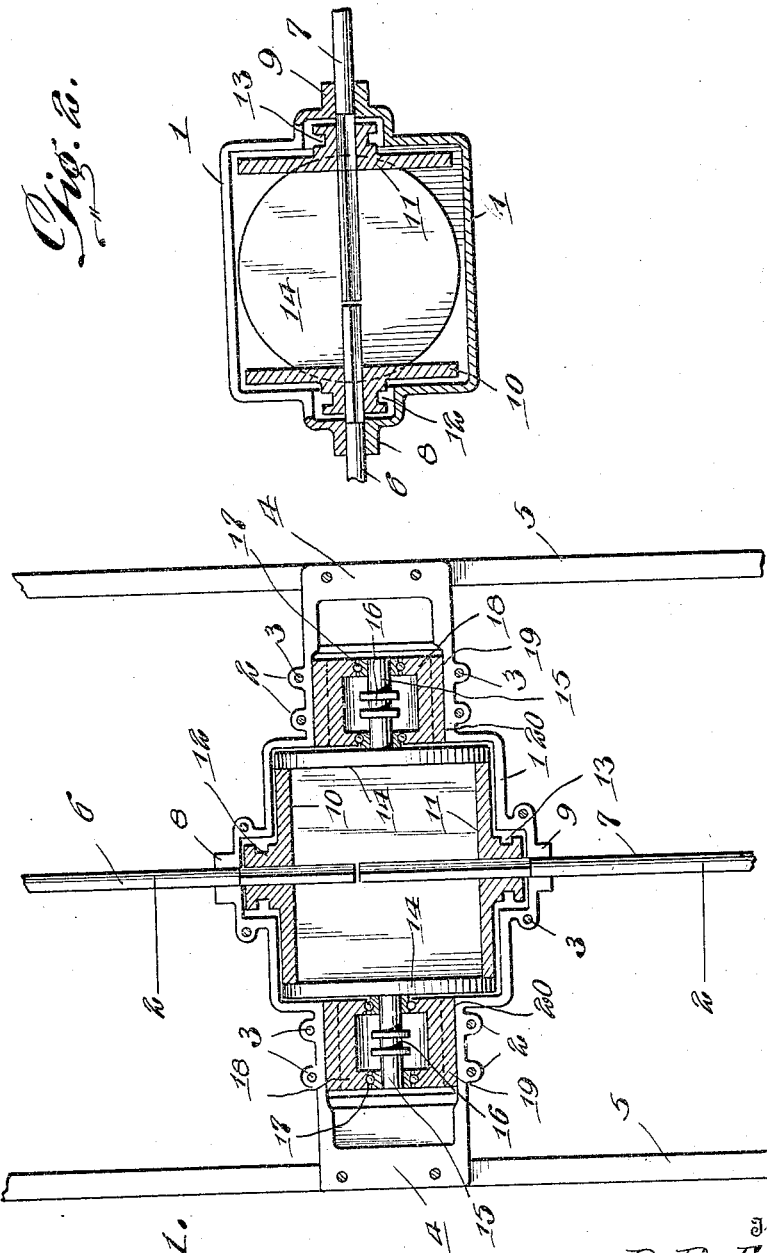

D ROY FRICK, OF ALMA, MICHIGAN.

TRANSMISSION-GEARING.

1,305,208.      Specification of Letters Patent.      Patented May 27, 1919.

Application filed October 10, 1916. Serial No. 124,846.

*To all whom it may concern:*

Be it known that I, D ROY FRICK, a citizen of the United States, residing at Alma, in the county of Gratiot and State of Michigan, have invented new and useful Improvements in Transmission-Gearings, of which the following is a specification.

This invention relates to transmission gearing, the object in view being to do away with all toothed gears and to provide a novel combination and arrangement of friction, driving and driven elements combined with friction transmission elements and so combined with and related to a driving shaft and a driven shaft, that the driven shaft may be operated at any desired speed ratio with relation to the driving shaft. Furthermore the driven shaft may be operated in a reverse direction to the driving shaft, the gearing as a whole being particularly designed for use in connection with motor vehicles for transmitting the power of the engine shaft to the propeller shaft which is connected through the usual differential gearing to the rear axle and driving wheels of the machine.

With the above and other objects in view the invention consists in the novel construction, combination and arrangement of parts, herein described, illustrated and claimed.

In the accompanying drawing:—

Figure 1 is a central horizontal section through the transmission gearing, showing the driving and driven shafts in elevation.

Fig. 2 is a vertical longitudinal section on the line 2—2 of Fig. 1.

The transmission gearing contemplated in this invention is mounted as a whole within a two-part or sectional casing, the same embodying sections 1 and the sections being provided with lugs or flanges 2 adapting them to be fastened by bolts 3 or the equivalent thereof in order that the sections may be separated to give access to the mechanism contained within the casing. The casing is also provided with the lateral extensions 4 which may be of sufficient length to rest upon and be bolted or otherwise fastened to longitudinal bars 5 of the frame of the vehicle.

The driving shaft 6 may constitute either the engine shaft or an extension thereof and the driven shaft 7 is arranged in longitudinal alinement therewith but adapted to rotate independently thereof. The casing is formed with a bearing 8 for the shaft 6 and is also formed with a bearing 9 for the shaft 7. The shaft 7 extends farther into the casing than the shaft 6 in order to provide for a greater amplitude of the shifting movement of the driven friction wheel hereinafter described in order to allow for reversing the direction of rotation of the driven shaft.

10 designates a driving friction wheel which is mounted on the driving shaft 6 and which may be either keyed thereto or formed with a non-circular opening to fit the shaft 6, the portion thereof within the casing being correspondingly non-circular in cross section, which will enable the wheel 10 to be shifted longitudinally of the shaft 6 while being rotated or actuated thereby. 11 designates the driven friction wheel which is mounted upon the driven shaft 7 in the same manner as the wheel 10 is mounted upon its shaft 6. In other words both of the wheels 10 and 11 are mounted to rotate with their respective shafts and are both slidable thereon. The wheel 10 is provided with a grooved hub or collar 12 in order to adapt a shifting member to be associated therewith and the wheel 11 is likewise provided with a groove or collar 13 for the same purpose. This enables the wheels 10 and 11 to be shifted longitudinally of their respective shafts and independently of each other.

Arranged on opposite sides of the shafts 6 and 7 are friction transmission wheels 14 each of which is carried by an independent rotary shaft 15 provided with a grooved collar 16 to receive a suitable shifting member in order that the wheels 14 may be moved a slight distance toward and away from the peripheries of the friction driving and driven wheels 10 and 11. Each of the shafts 15 is preferably mounted to turn in ball bearings 17 each comprising an outer non-rotary frame 18 having flanges 19 which are received in ways or grooves 20 formed in the interior of the lateral extensions 4 of the casing.

When the wheels 14 are moved out of contact with the wheels 10 and 11, no power is transmitted from the shaft 6 to the shaft 7. When, however, the wheels 14 are moved into frictional engagement with the wheels 10 and 11, the wheel 10 drives both of the wheels 14 and the latter both in turn drive the wheel 11, motion thus being transmit-